United States Patent [19]

Lykov et al.

[11] Patent Number: 4,505,733

[45] Date of Patent: Mar. 19, 1985

[54] PROCESS FOR PRODUCING LIQUID COMBINED FERTILIZERS

[76] Inventors: Mikhail V. Lykov, Simonovsky val, 22, korpus 2, kv. 149, Moscow; Vladimir M. Lembrikov, ulitsa Novlyanskaya, 8, kv. 1, Voskresensk Moskovskoi; Svetlana I. Golovkina, Kashirskoe shosse, 88, korpus 2, kv. 268, Moscow; Nadezhda N. Malakhova, ulitsa Mendeleeva, 3, kv. 70; Vladimir N. Sterlin, ulitsa Novlyanskaya, 8b, kv. 52, both of Voskresensk Moskovskoi; Viktor N. Kochetkov, ulitsa Shvernika, 5, korpus 1, kv. 22; Gennady M. Markovin, 6 Mikroraion Teplogo Stana, korpus 89, kv. 94, both of Moscow, all of U.S.S.R.

[21] Appl. No.: 576,116

[22] Filed: Feb. 2, 1984

[51] Int. Cl.$^3$ .............................................. C05B 7/00
[52] U.S. Cl. .......................................... 71/34; 71/43; 423/310
[58] Field of Search ...................... 71/34, 43; 423/313, 423/310, 309, 321 R, 321 S

[56] References Cited

U.S. PATENT DOCUMENTS 3,950,495  4/1976  Ries ..................................... 423/306

FOREIGN PATENT DOCUMENTS 1379796  1/1975  United Kingdom .

OTHER PUBLICATIONS

CA 125836c, Ivanov et al., "Technological Production of Complex Liquid Fert. from Extra. Phos. Acid", vol. 76, p. 407, 1972.
CA 112053v, Sidorina et al., "Agrochemical Appraisal of Iron & Aluminum Phosphates . . . Process", vol. 76, p. 396, 1972.
CA 125839f, Gruncharov et al., "Stabilization of Suspensions Prepared During the Ammoniation of Extrac. Phos. Acid", p. 408, vol. 76, 1972.
CA 4837z, Nabiev et al., "Polyphosphoric Acid and Liquid Complex Fertilizers Based on Extraction with Phosphoric Acid", vol. 75, p. 406, 1971.

Primary Examiner—Ferris H. Lander
Attorney, Agent, or Firm—Ladas & Parry

[57] ABSTRACT

The process for producing liquid combined fertilizers according to the present invention comprises neutralization of extraction-type phosphoric acid with an excess of gaseous ammonia taken in an amount of 1–1.2 parts by weight relative to the content thereof in the final product at a temperature of the reagents of from 60° to 250° C., mixing of the resulting neutralization products with a liquid phase consisting of water or ammonia water and a portion of the final product recycled to the process; said mixing is conducted under a pressure of 0.05–0.7 atm and at an excess of water in the liquid phase of 1.05–2.0 parts by weight relative to the content thereof in the final product; the process is carried out at a ratio of circulation of the final product of 2 to 40 and at a pressure differential at the stages of neutralization and mixing of from 0.1 to 6 atm.

The process according to the present invention may be useful in the agriculture.

3 Claims, No Drawings

PROCESS FOR PRODUCING LIQUID COMBINED FERTILIZERS

FIELD OF THE INVENTION

The present invention relates to a process for producing liquid combined fertilizers widely employed in the agriculture.

BACKGROUND OF THE INVENTION

Known in the art is a process for producing liquid combined fertilizers (LCF) by way of neutralization in a jet-type reactor of extraction phosphoric acid containing 60-72% $P_2O_5$ (10-35% of $P_2O_5$ being present in the polyform) by means of gaseous ammonia supplied in an amount close to that in the final product, followed by mixing and cooling of the reaction products with water in another apparatus (cf. U.S. Pat. No. 3,950,495 published Apr. 13, 1976). The thus-obtained products are then mixed in a turbulent reactor with a portion of the final product which has been preliminarily cooled in external coolers-heat-exchangers and post-neutralized in a special apparatus.

The process disadvantage resides in the multi-stage character of the production of LCF which results in an increased number of items of the process equipment and complicates the plant operation; it is also necessary to provide for a forced external recycle of the LCF with the use of pumping means; the disadvantage of the process also resides in the difficulty of obtaining LCF with the content of polyform $P_2O_5$ of above 40% by weight from extraction phosphoric acid containing $P_2O_5$ polyform in an amount below 10% by weight.

The closest prior art process is a process for producing liquid combined fertilizers (LCF) (cf. British Pat. No. 1,379,796 Cl. C IA C3 A D 37), wherein extraction phosphoric acid pre-evaporated and heated to a temperature of 112°-224° C. consisting of ortho-polyforms or an acid produced by intermixing ortho-phosphoric and polyphosphoric acids with a concentration of $P_2O_5$ of 62-70% is fed simultaneously with gaseous ammonia into an isothermal reactor maintained under a pressure of 0.5 to 20 atm and at a temperature of 278° to 427° C. due to heat of neutralization. Ammonia is fed in an amount necessary for the production of a partly neutralized melt of ammonium polyphosphate. The reaction products at a temperature of essentially 354°-389° C. are delivered to a mixer, whereinto ammonia and water or ammonia water are also supplied in an amount equal to the content thereof in the final product. Atmospheric pressure and temperature of from 42° to 118° C. are maintained in the mixer due to the recycling of the final product preliminarily cooled in external cooling heat-exchangers. The gases and non-reacted ammonia are passed through packed absorbers, wherein ammonia is trapped by means of water or an aqueous solution of the LCF. The final LCF product has a content of nitrogen of 10 to 13%, a content of $P_2O_5$ of 33-37% by weight, wherein the amount of polyforms ranges from 65 to 80% of the total content of $P_2O_5$.

The process has the following disadvantages: the removal of the neutralization heat is effected by recycling the major portion of the final product and cooling thereof in external cooling heat-exchangers. Due to a small temperature differential in the heat-exchangers and low coefficient of heat transfer due to a high viscosity of LCF, great surface areas of the heat exchange and powerful pumps are required. Furthermore, a large volume of the apparatus for mixing the reaction products of neutralization with water and the final recycled cooled product leads to local overheatings of the solution, this causing an increased hydrolysis and losses of ammonia which should be trapped in special apparatus-absorbers. The separation of the ammonia stream to the jet-type reactor (and to the post-neutralizer-mixing apparatus and the stream of the LCF to recycling and output of the final product complicate monitoring of the process and obtaining a stable quality of the LCF.

The above disadvantages do not allow the production of LCF with a content of polyforms of above 50% from extraction phosphoric acid with a concentration of below 62% based on $P_2O_5$, or from acids with a content of polyforms therein below 30%.

SUMMARY OF THE INVENTION

It is an object of the present invention to provide such a process for the production of liquid combined fertilizers which would make it possible to use, as the starting feedstock, both a high-concentration (with respect to $P_2O_5$) and a low-concentration extraction phosphoric acid.

This object is accomplished by the provision of a process for producing liquid combined fertilizers by way of neutralization of extraction phosphoric acid with gaseous ammonia at a temperature of the reagents of from 60° to 250° C. and mixing of the resulting products, neutralization with a liquid phase consisting of water or ammonia water and a portion of the final product recycled into the process, characterized in that the neutralization is conducted at an excess of gaseous ammonia in an amount of 1-1.2 parts by weight relative to its content in the final product; mixing of the neutralization products with the liquid phase is conducted under a pressure of 0.05 to 0.7 atm and at an excess of water in the liquid phase of 1.05-2.0 parts by weight relative to its content in the final product; the process is carried out at a ratio of circulation of the final product of from 2 to 40 and the pressure drop at the stages of neutralization and mixing within the range of from 0.1 to 6 atm.

As the starting extraction phosphoric acid, an acid is used with a concentration of 60-64% based on $P_2O_5$ with a content of polyforms of up to 10% relative to the total content of $P_2O_5$ in the acid.

When using extraction phosphoric acid with a concentration of below 60% by weight, this acid is preliminarily treated, before neutralization, with gaseous ammonia at a molar ratio of $NH_3:P_2O_5$ of from 0.1 to 1.7 and at a temperature within the range of from 160° to 200° C. with the removal of water vapours.

DETAILED DESCRIPTION OF THE INVENTION

The process according to the present invention is carried out in the following manner.

Extraction phosphoric acid with a concentration of 56 to 72% based on $P_2O_5$ and a content of polyforms of up to 40% is fed at a temperature of 60° to 250° C. together with gaseous ammonia having temperature of 60° to 150° C. into a jet-type reactor which is a component of the main apparatus and which is immersed into the liquid phase consisting of a portion of the final product and water or ammonia water. The process of neutralization is conducted at an excess of gaseous ammonia equal to 1-1.2 parts by weight relative to its content in the final product. In this case the reactor is set under pressure which is maintained by 0.1–6 atm higher than in the case of mixing the resulting products of the reaction of neutralization with the liquid phase. This enables a considerable intensification of the processes of dispersing and intermixing of the reagents. An increased concentration of ammonia in a jet reactor makes it possible to increase the neutralization depth of extraction phosphoric acid; a greater amount of heat is evolved, which, in turn, contributes to the manufacture of products with a higher content of polyforms at a low content thereof in the starting extraction phosphoric acid.

After leaving the jet reactor, the resulting neutralization products in the form of a melt of ammonium polyphosphate, water vapours and non-reacted ammonia are dissolved in the liquid phase. The liquid phase consists of water or ammonia water and a portion of the final product recycled into the process. The excess of water in the liquid phase is 1.05–2.0 parts by weight relative to its content in the final product. The process is conducted at a circulation ratio of the final product of from 2 to 40.

The temperature of the interaction of the resulting neutralization products with the liquid phase is adjusted by varying the residual pressure. The heat of neutralization is removed due to evaporation of water under a reduced pressure (0.05–0.7 atm), this ensuring a stable temperature of the solution within the range of from 35° to 90° C. depending on the vacuum in the apparatus. The formed vapour-liquid emulsion is moved upwardly and separation of vapours and the solution takes place in a separator. Due to the difference in gravity values there occurs an intensive circulation of the solution within the apparatus circuit. Therefore, the formation of the gas phase and shock waves at a particular fineness of the product results in an increased interface surface which ensures active hydrodynamic conditions and, accordingly, an intensive character of the heat- and mass-transfer processes. The ascending flow of a gas-liquid emulsion consisting of 2 to 40 parts of the liquid phase per part by weight of the neutralization products makes it possible to ensure a high circulation ratio at which the postneutralization in the apparatus proceeds under isoconcentration and isothermal conditions. The condensation of the resulting liquor vapour occurs at higher values of heat emission coefficient which makes it possible to reduce the surface area of the heat-exchanger and to increase the temperature drop of the coolant (water) with a corresponding lowering of its supply rate. The vapour condensate with the trapped ammonia is recycled to the process for the production of LCF (for dissolution of the fusion cake). Upon condensation of the vapour ammonia is fully entrained, wherefore the condenser simultaneously serves as an absorption apparatus.

When the acid concentration is lowered below 60% based on $P_2O_5$, it contains a significant amount of water which upon evaporation increases the partial pressure of vapours at the stage of neutralization, delays the dehydration process and lowers the content of polyforms in the reaction products. In this case it is necessary to pretreat the acid with ammonia at a molar ratio of 0.1 to 1.7 between $NH_3$ and $P_2O_5$ and at a temperature within the range of from 160° to 200° C. with separation of water vapours. This will make it possible to obtain, at the main stage of neutralization (in an excess of ammonia) a deep dehydration with a degree of conversion in the final product of up to 50%.

Upon dissolution of the fusion cake with LCF and water, especially for LCF grades with an increased content of nitrogen, ammonia is partly entrained with the formed water vapours. Upon condensation of the vapours a weak ammonia water is formed. In this case it is advisable to use the condensate for dissolution of the fusion cake. At a high excess of ammonia the process of condensation of the liquor vapour is conducted at reflux temperatures which makes it possible to recycle the excessive amount of ammonia to the process for the production of liquid combined fertilizers.

The effectiveness of the selected process parameters within the above-specified ranges is illustrated in the following Tables.

TABLE 1

| Amount of ammonia supplied to the stage of neutralization of phosphoric acid relative to ammonia content in the final product | | | | | | |
|---|---|---|---|---|---|---|
| Nos | Amount of ammonia, kg/kg: | 0.7 | 1.0 | 1.1 | 1.2 | 1.5 |
| | | 3 | 4 | 5 | 7 | |
| 1 | Concentration of EPA$^x$ based on $P_2O_5$, wt. % | 64 | 64 | 64 | 64 | 64 |
| 2 | Content of nitrogen in LCF, wt. % | 10 | 10 | 11 | 12 | 12 |
| 3 | Content of $P_2O_5$ in LCF, wt. % | 34 | 34 | 37 | 40 | 40 |
| 4 | Conversion degree in LCF | 50 | 60 | 60 | 62 | 62 |
| 5 | Entrainment of ammonia, % | — | — | 0.1 | 0.5 | 1 |

$^x$EPA — extraction phosphoric acid

As it is seen from Table 1, the most effective is the amount of ammonia supplied to neutralization equal to 1.0–1.2 parts by weight relative to its content in the final product, since lowering thereof results in a reduced degree of conversion and content in the final product, while increasing amount of ammonia does not increase the content of nutrient agents, but results in an increased amount of entrained ammonia.

TABLE 2

| Pressure in the stage of mixing of the reaction products and the liquid phase | | | | | | |
|---|---|---|---|---|---|---|
| Nos | Pressure, atm | 0.03 | 0.12 | 0.3 | 0.5 | 0.6 |
| 1 | Concentration of EPA based on $P_2O_5$, wt. % | 64 | 64 | 64 | 64 | 64 |
| 2 | Temperature of LCF, °C. | 25 | 52 | 73.7 | 85.9 | 90.5 |
| 3 | Degree of hydrolysis in the mixing stage, % | 1.05 | 0.1 | 0.2 | 0.5 | 1.0 |
| 4 | Surface area of heat-exchangers, m$^2$/t LCF | 3.3 | 3.6 | 4.0 | 2.66 | 2.4 |

As it is seen from Table 2, most preferable is the pressure within the range of from 0.12 to 0.5 atm, since upon reduction thereof the surface of heat-exchangers and the consumption of metal are increased due to an increased amount of the resulting vapour condensate and decreasing of the temperature difference between the cooling water and vapour, while upon elevation thereof the degree of hydrolysis at the mixing stage is sharply increased with a corresponding reduction of the degree of conversion in the final product.

According to the process of the present invention LCF are obtained of the grades (N:P$_2$O$_5$): 10:34, 11:37, 12:40 with the content of polyforms of from 50 to 80% of the total amount of P$_2$O$_5$. The inspection of quality of the final product is effected by the amount of ammonia supplied to neutralization; pH of the fiinal product is kept at 6-6.5.

The use of the process according to the present invention makes it possible to obtain standard grades of LCF (N:P$_2$O$_5$)—10:34, 11:37, 12:40 mainly from orthophosphoric acid with a concentration of below 60% based on P$_2$O$_5$ with a conversion degree of up to 50%.

The process according to the present invention makes it possible to obtain LCF with the total content of nutrient agents of up to 52% by weight instead of 44% by weight, which gives an economic effect in the production stage due to a lower consumption of water, increased capacity of the plant and reduced power consumption, as well as in the stages of transportation, storage and introduction into the soil.

Furthermore, the process flow sheet is considerably simplified due to the preparation of the product in one apparatus, obviation of the use of stirring mechanical means, powerful pumping devices, the system of absorption; the surface area of heat-exchange apparatus is reduced by a factor of 3 to 4. The reliability of operation of the equipment is also increased.

For a better understanding of the present invention, some specific examples are given hereinbelow by way of illustration.

EXAMPLE 1

Extraction phosphoric acid comprising in wt.%: P$_2$O$_5$—64.0; SO$_3$—3.5; CaO—0.3; sesquioxides—2.0; F—0.2, polyforms—4% of the overall P$_2$O$_5$ at the temperature of 80° C. in the amount of 1,000 kg is neutralized with gaseous ammonia at the temperature of 100° C. in the amount of 229 kg (weight amount of ammonia relative to its content in the final product is equal to 1.0). The fusion cake is formed at the temperature of 320° C. under the pressure of 0.32 atm. The neutralization products are reacted with a liquid phase consisting of the final product in the amount of 20,000 kg and water—1,155 kg (the excess of water relative to its content in the final product is 1.45 part by weight) under the residual pressure of 0.12 atm. The evaporation of water in the amount of 502 kg is carried out at a constant temperature of 52° C. which corresponds to the residual pressure in the apparatus. The resulting vapour-liquid emulsion is separated, in a separator, into the final product which is discharged in the amount of 1,882 kg, recycling liquid phase of the same composition and temperature as the final product, and water vapours with traces of ammonia. The condensed water vapours at a temperature below the boiling point are recycled to the process for the production of liquid combined fertilizers. The final product contains, percent by weight: nitrogen—9.5-10.5, P$_2$O$_5$—33.5-34.5, including in polyforms—60% of the total content of P$_2$O$_5$.

EXAMPLE 2

Extraction phosphoric acid comprising in wt.%: P$_2$O$_5$—64.0; SO$_3$—3.5; CaO—0.3; sesquioxides—3.0; F—0.2, polyforms—4% of the overall P$_2$O$_5$ at the temperature of 80° C. in the amount of 1,000 kg is neutralized with gaseous ammonia having temperature of 100° C. in the amount of 229 kg (the weight amount of ammonia relative to the content thereof in the final product is equal to 1.0). The neutralization products are reacted with a liquid phase consisting of the final product in the amount of 72,000 kg and water in the amount of 1,069 kg (the excess of water relative to the content thereof in the final product is equal to 1.34 part by weight), under the residual pressure of 0.5 atm.

The evaporation of water in the amount of 416 kg is carried out at a constant temperature of 86° C. which corresponds to the residual pressure in the apparatus. The resulting vapour-liquid emulsion is separated, in a separator, into the final product which in the amount of 1,882 kg is withdrawn from the apparatus, the recycling liquid phase of the same composition and temperature as the final product and water vapours with traces of ammonia. The condensed water vapours at a temperature below the boiling point are recycled to the process for the production of liquid combined fertilizers. The final product contains, percent by weight: nitrogen—9.5-10.5, P$_2$O$_5$—33.5-34.5, including 58% of polyforms of the total content of P$_2$O$_5$.

EXAMPLE 3

Extraction phosphoric acid comprising, in wt.%: P$_2$O$_5$—64.0; SO$_3$—3.5; CaO—0.3; sesquioxides—2.0%; F—0.2; polyforms—4% of the overall P$_2$O$_5$ at the temperature of 80° C. and in the amount of 1,000 kg is neutralized with gaseous ammonia having a temperature of 100° C. in the amount of 232 kg (the weight content of ammonia relative to the content thereof in the final product is 1.0). The neutralization products are reacted with the liquid phase consisting of the final product in the amount of 9,000 kg and water in the amount of 903 kg (the excess of water relative to the content thereof in the final product is 1.4 part by weight), under the residual pressure of 0.3 atm. The evaporation of water in the amount of 400 kg is carried out at a constant temperature of 75° C. which corresponds to the residual pressure in the apparatus. The resulting vapour-liquid emulsion is separated, in a separator, into the final product which is discharged in the amount of 1,735 kg, a recycled liquid phase having the same composition and temperature as the final product and water vapours with traces of ammonia. The condensed water vapours at a temperature below the boiling point are recycled to the process for the production of liquid combined fertilizers. The final product contains, in wt.%: nitrogen—10.5-11.5%, P$_2$O$_5$—36.5-37.5% including 64% of polyforms of the total content of P$_2$O$_5$.

EXAMPLE 4

Extraction orthophosphoric acid comprising, in wt.%: P$_2$O$_5$—58; SO$_3$—3.1; CaO—0.27; sesquioxides—1.8; F—0.185 at the temperature of 140° C. and in the amount of 1,000 kg is treated with gaseous ammonia having a temperature of 140° C. and taken in the amount of 52 kg (the molar ratio of NH$_3$:P$_2$O$_5$=0.75) with separation of water vapours in the amount of 135 kg. The fusion cake at the temperature of 180° C. in the amount of 813 kg is neutralized with gaseous ammonia in the amount of 207 kg (the excess of ammonia relative to its content in the final product is 1.20). The neutralization products (fusion cake of ammonium polyphosphates, unreacted ammonia and water vapours) are reacted with a liquid phase consisting of the final product in the amount of 34,000 kg and water—952 kg (the excess of water relative to the content thereof in the final product is 1.4 parts by weight) under the residual pressure of 0.2 atm. The evaporation of water in the amount of 318 kg is carried out at a constant temperature of 65° C. which corresponds to the residual pressure in the apparatus. The vapour-gas mixture in the separator in separated into the final product which is withdrawn in the amount of 1,706 kg, a recycled liquid phase having the same composition and temperature as the final product and a liquor vapour in the amount of 318 kg, as well as ammonia in the amount of 52 kg. In a heat-exchanger the formed liquor vapour condensate is recycled for dissolution to the process for the production of LCF, while the gaseous ammonia is pressurized and used for the treatment of extraction phosphoric acid and other kinds of fertilizers. The final product contains, percent by weight: nitrogen—9.5-10.5, $P_2O_5$—33.5-34.5 including 50% of polyforms of the total content of $P_2O_5$.

EXAMPLE 5

Extraction phosphoric acid comprising, in wt.%; $P_2O_5$—68.0; $SO_3$—2.82%; $Fe_2O_3$—0.84; sesquioxides—2.47; F—0.1%; polyforms—30% of the overall $P_2O_5$ having the temperature of 100° C. in the amount of 1,000 kg is neutralized with gaseous ammonia with the temperature of 100° C. in the amount of 243 kg (the weight content of ammonia relative to that in the final product is 1.0). The neutralization products are reacted with a liquid phase consisting of the final product in the amount of 20,000 kg and water in the amount of 1,274 kg (the excess of water relative to the content thereof in the final product is 1.61 parts by weight) under the residual pressure of 0.2 atm. The evaporation of water in the amount of 517 kg is carried out at a temperature of 65° C. which corresponds to the residual pressure in the apparatus. The resulting vapour-liquid mixture in a separator is separated into the final product which is withdrawn in the amount of 2,000 kg and a recycled liquid phase having the same composition and temperature as the final product and water vapours with traces of ammonia. The condensed water vapours at a temperature below the boiling point are recycled to the process for the production of liquid combined fertilizers.

The final product contains, percent by weight: nitrogen—9.5-10.5, $P_2O_5$—33.5-34.5 including 70-75% of polyforms of the total content of $P_2O_5$.

EXAMPLE 6

Extraction phosphoric acid comprising, in wt.%: $P_2O_5$—64.0; $SO_3$—3.5; CaO—0.3%; sesquioxides—2.47; F—0.2%; polyforms—4% of the overall $P_2O_5$ having a temperature of 80° C. in the amount of 1,000 kg is neutralized with gaseous ammonia with the temperature of 80° C. in the amount of 233 kg. The neutralization products are reacted with a liquid phase consisting of the final product in the amount of 48,000 kg and water—846 kg (the excess of water relative to the content thereof in the final product is 1.66 parts by weight) under the residual pressure of 0.2 atm. The evaporation of 479 kg of water is carried out at a constant temperature of 67° which corresponds to the residual pressure in the apparatus. The resulting vapour-liquid mixture is separated, in a separator, into the final product which is withdrawn in the amount of 1,600 kg, a recycled liquid phase having the same composition and temperature as the final product and water vapours with traces of ammonia.

The condensed water vapours at a temperature below the boiling point are recycled to the process for the production of liquid combined fertilizers.

The final product contains, percent by weight: nitrogen—12, $P_2O_5$—40, including 58% of polyforms of the total content of $P_2O_5$.

EXAMPLE 7

Extraction phosphoric acid comprising, in wt.%: $P_2O_5$—72.0; $SO_3$—2.82; $Fe_2O_3$—0.84; sesquioxides—2.47; F—0.1; polyforms 40% of the overall $P_2O_5$ having a temperature of 120° C. in the amount of 1,000 kg is neutralized with gaseous ammonia at the temperature of 120° C. in the amount of 265 kg. The neutralization products are reacted with a liquid phase consisting of the final product in the amount of 43,600 kg and water in the amount of 1,547 kg (the excess of water relative to the content thereof in the final product is 1.61) under the residual pressure of 0.05 atm. The evaporation of water in the amount of 662 kg is carried out at a constant temperature of 35° C. which corresponds to the residual pressure in the apparatus. The resulting liquid-vapour mixture in a separator is separated into the final product which is withdrawn in the amount of 2,180 kg, a recycled liquid phase having the same composition and temperature as the final product and water vapours with traces of ammonia.

The condensed water vapours at a temperature below the boiling point are recycled to the process for the production of liquid combined fertilizers.

The final product contains, percent by weight: nitrogen—9.5-10.5, $P_2O_5$—33.5-34.5 including 75-85% by polyforms of the total content of $P_2O_5$.

EXAMPLE 8

Extraction phosphoric acid comprising, in wt.%: $P_2O_5$—60.0; $SO_3$—3.5; CaO—0.3; sesquioxides—2%; F—0.2 having a temperature of 120° C. in the amount of 1,000 kg is neutralized with gaseous ammonia at the temperature of 120° C. in the amount of 235 kg (the weight amount of ammonia relative to that in the final product is equal to 1.1).

The neutralization products are reacted with a liquid phase consisting of the final product in the amount of 25,000 kg and water in the amount of 872 kg (the excess of water relative to the content thereof in the final product is 1.24 part by weight) under the residual pressure of 0.7 atm. The evaporation of water in the amount of 321 kg is carried out at a constant temperature of 94° C. which corresponds to the residual pressure in the apparatus. The resulting vapour-liquid mixture is separated, in a separator, into the final product which is discharged in the amount of 1,765 kg, a recycled liquid phase having the same composition and temperature as the final product, and water vapours with traces of ammonia.

The condensed water vapours at a temperature below the boiling point are recycled to the process for the production of liquid combined fertilizers.

The final product contains, percent by weight: nitrogen—9.5-10.5, $P_2O_5$—33.5-34.5, including 50% of polyforms of the total $P_2O_5$ content.

What is claimed is:

1. A process for producing liquid combined fertilizers comprising neutralization of extraction phoshoric acid with an excess of gaseous ammonia taken in an amount of 1-1.2 parts by weight of its content in the final product at a temperature of the reagents ranging from 60° to 250° C., mixing the products of neutralization with a liquid phase consisting of water, or ammonia water and a portion of the final product recycled to the process, said mixing being conducted under a pressure of 0.05-0.7 atm and at an excess of water in the liquid phase of 1.05-2.0 parts by weight relative to its content in the final product; the process being carried out at a ratio of circulation of the final product of 2 to 40 and at a pressure differential at the stages of neutralization and mixing within the range of from 0.1 to 6 atm.

2. A process as claimed in claim 1, wherein as the starting extraction phosphoric acid an acid is used with a concentration of 60-64% as calculated for $P_2O_5$ with a content of polyforms of up to 10% of the total content of $P_2O_5$ in the acid.

3. A process as claimed in claim 1, wherein in the case of using extraction phosphoric acid with a concentration of below 60 wt.% for $P_2O_5$, the acid is treated, prior to the neutralization, with gaseous ammonia at a molar ratio of $NH_3:P_2O_5$ of 0.1 to 1.7 at a temperature of 160°-200° C. with the removal of water vapours.

* * * * *